United States Patent
Kwon

(10) Patent No.: US 6,839,131 B2
(45) Date of Patent: Jan. 4, 2005

(54) METHOD AND APPARATUS FOR MONITORING OPTICAL SIGNAL PERFORMANCE IN WAVELENGTH DIVISION MULTIPLEXING SYSTEM

(75) Inventor: Seo-Won Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 10/215,038

(22) Filed: Aug. 9, 2002

(65) Prior Publication Data

US 2003/0066953 A1 Apr. 10, 2003

(30) Foreign Application Priority Data

Sep. 22, 2001 (KR) ........................................ 2001-58863

(51) Int. Cl.[7] .............................................. G01N 21/00
(52) U.S. Cl. ..................................................... 356/73.1
(58) Field of Search ..................... 356/73.1; 385/11–16, 385/100–114; 398/9–38, 43–51

(56) References Cited

U.S. PATENT DOCUMENTS

| | | | |
|---|---|---|---|
| 5,796,479 A | 8/1998 | Derickson et al. | |
| 5,969,834 A | 10/1999 | Farber et al. | |
| 6,268,943 B1 | 7/2001 | Kang | |
| 6,396,574 B1 | 5/2002 | Lee et al. | |
| 6,619,864 B2 * | 9/2003 | Johnson et al. | 398/34 |

FOREIGN PATENT DOCUMENTS

KR    10-292809    3/2001

OTHER PUBLICATIONS

An article authored by Kang et al., published in Oct. 1998 in IEEE Photonics Technology Letters, and entitled *Temperature–Independent Strain Sensor System Using a Tilted Fiber Bragg Grating Demodulator.*

* cited by examiner

Primary Examiner—Tu T. Nguyen
(74) Attorney, Agent, or Firm—Robert E. Bushnell, Esq.

(57) ABSTRACT

An apparatus for monitoring a wavelength division multiplexed optical signal transmitted onto a main optical path includes: an amplified spontaneous light emitter for generating an amplified spontaneous emission signal and transmitting the same to onto a reference optical path; at least one fiber bragg grating for sending out an amplified spontaneous emission signal having a reference wavelength by reflecting or absorbing only that part of the amplified spontaneous emission signal which consists of a reflection wavelength or an absorbance wavelength; an optical switch for outputting at least one of the wavelength division multiplexed optical signals branched from the main optical path or one of the amplified spontaneous emissions including the reference wavelengths in response to a switching control signal input; a tunable optical filter for filtering the optical signal outputted from the optical switch using varied filter characteristics, and for outputting the filtered optical signal; and a control unit for measuring an optical wavelength, an optical power and an optical signal to noise ratio of the wavelength division multiplexed optical signal based on the analyzed reference wavelength.

15 Claims, 2 Drawing Sheets

METHOD AND APPARATUS FOR MONITORING OPTICAL SIGNAL PERFORMANCE IN WAVELENGTH DIVISION MULTIPLEXING SYSTEM

CLAIM OF PRIORITY

This application makes reference to, incorporates the same herein, and claims all benefits accruing under 35 U.S.C. §119 from my application entitled APPARATUS FOR OPTICAL SIGNAL PERFORMANCE MONITORING IN WAVELENGTH DIVISION MULTIPLEXING SYSTEM filed with the Korean Industrial Property Office on Sep. 22, 2001 and there duly assigned Serial No. 58863/2001.

BACKGROUND OF THE INVENTION

1. Technical Field

The present invention relates generally to an apparatus for monitoring optical signal performance in a wavelength division multiplexing system, and in particular, to an apparatus for monitoring optical signal performance in a link section without a fiber amplifier.

2. Related Art

A wavelength division multiplexing (WDM) optical communication system measures wavelength, optical power, and optical signal to noise ratio (OSNR) of an optical signal being transmitted through an optical transmission line on an optical link in order to monitor the performance of the optical signal itself. Also, the WDM optical communication system is equipped with a device for detecting optical signal degradation in a particular link, and sending a notification of the optical signal degradation to a system operator and a manager or providing information that enables restoration of the degradation by itself.

In general, the WDM optical communication system for use in the measurement of the optical wavelength, optical power, and optical signal to noise ratio of the wavelength division multiplexed optical signal includes an optical spectrum analyzer mounted with a diffraction grating and a photo diode array, a fiber bragg grating (FBG), and a photo diode array. However, when optical equipment like the diffraction grating and the photo diode array are employed, it is difficult to achieve a more efficient optical space array. In fact, this problem is not entirely new to anyone skilled in the art who is well aware of the difficulty with the precise measurement of the optical wavelength, the optical power, and the optical signal to noise ratio especially when the optical space array has not been done accurately.

As an attempt to solve the problem, there is a different type of equipment for measuring the optical signal, the optical power and the optical signal to noise ratio of the WDM optical system disclosed in Korean Pat. No. 10-292809 entitled APPARATUS FOR MEASURING THE WAVELENGTH, OPTICAL POWER AND OPTICAL SIGNAL-TO-NOISE RATION OF EACH OPTICAL SIGNAL IN WAVELENGTH-DIVISION MULTIPLEXING OPTICAL COMMUNICATION, invented by Lee et al., with patent registration date 27 Mar. 2001, corresponding to U.S. Pat. No. 6,396,574 issued on 28 May 2002. According to the disclosure, a fiber amplifier is employed to measure the wavelength division multiplexed optical signal that is transmitted over the optical link. For example, the equipment uses an amplified spontaneous emission (ASE) that is generated by amplifying the wavelength division multiplexed optical signal in an Erbium doped fiber amplifier. In addition, the equipment includes two fiber bragg gratings (FBG) for measuring a specific wavelength of the amplified spontaneous emission outputted from the fiber amplifier, and generates a reference wavelength for measuring the wavelength division multiplexed optical signal. Despite such a configuration, the equipment could not be used for the WDM system without a fiber amplifier. Besides, when the measurement is obtained using the equipment, that is, when two optical signals reflected from two FBG are used as the reference wavelength of the amplified spontaneous emission, the resolution of the measurement is low.

Efforts have been made to improve optical signal monitoring. Exemplars of recent efforts in the art include U.S. Pat. No. 5,796,479 to Derickson et al., entitled SIGNAL MONITORING APPARATUS FOR WAVELENGTH DIVISION MULTIPLEXED OPTICAL TELECOMMUNICATIONNETWORKS, issued on Aug. 18, 1998, U.S. Pat. No. 5,969,834 to Farber et al., entitled METHOD AND APPARATUS FOR MONITORING WAVELENGTH MULTIPLEXED OPTICAL SIGNALS, issued on Oct. 19, 1999, U.S. Pat. No. 6,268,943 to Kang, entitled OPTICAL SNR MEASURER IN WDM OPTICAL TRANSMITTING DEVICE, issued on Jul. 31, 2001, and an article authored by Kang et al., published in October 1998 in IEEE Photonics Technology Letters, and entitled TEMPERATURE-INDEPENDENT STRAIN SENSOR SYSTEM USING A TILTED FIBER BRAGG GRATING DEMODULATOR.

While these recent efforts provide advantages, it is noted that they fail to adequately provide an apparatus for efficiently and conveniently monitoring optical signal performance in a wavelength division multiplexing system.

SUMMARY OF THE INVENTION

It is, therefore, an object of the present invention to provide an apparatus for monitoring optical signal performance which can be applied to a wavelength division multiplexing optical communication system without a fiber amplifier.

It is another object of the present invention to provide an apparatus for monitoring optical signal performance using a tunable optical filter, in which the apparatus has a configuration capable of measuring the optical wavelength, the optical power, and the optical signal to noise ratio of an optical signal with a high resolution, using a plurality of reference wavelengths.

It is still another object of the present invention to provide an apparatus for monitoring optical signal performance on a wavelength division multiplexed optical link based on a reference wavelength generated by using an amplified spontaneous emission and a tilted fiber bragg grating.

It is still another object of the present invention to provide an apparatus for monitoring optical signal performance which enables measurement of wavelength division multiplexed optical signal performance more conveniently by generating a reference wavelength for measuring the optical signal using an amplified spontaneous emission and a tilted fiber bragg grating, and through by selectively switching the reference wavelength with the optical signal on a wavelength division multiplexed optical link using an optical switch.

To achieve the above objects, there is provided an apparatus for monitoring wavelength division multiplexed optical signal performance transmitted through a main optical path, the apparatus including: an amplified spontaneous light emitter for generating an amplified spontaneous emission signal and transmitting the same to a reference optical path; at least one fiber bragg grating for sending out an amplified spontaneous emission signal having a reference wavelength by reflecting or absorbing only part of the amplified spontaneous emission signal transmitted onto the reference optical path that consists of a reflection wavelength or an absorbance wavelength, in which a predetermined reflection wavelength or an absorbance wavelength is separately disposed on the reference optical path; a 1×2 optical coupler, disposed on the main optical path, for branch outputting part of the wavelength division multiplexed optical signal; a 2×1 optical switch, which, in response to a switching control signal input, outputs at least one of the wavelength division multiplexed optical signals branched from the optical coupler and one of the amplified spontaneous emission including the main mode reference wavelength and the side mode reference wavelength; a tunable optical filter, of which the filter characteristics vary corresponding to a filtering control signal with a designated form, for filtering off the optical signal outputted from the optical switch using the varied filter characteristics, and for outputting the filtered optical signal; and a controller for providing a switching control signal and a filtering control signal having a designated frequency to the optical switch and the tunable optical filter, analyzing a reference wavelength of an output from a photo diode that converts an output of the tunable optical filter photoelectrically and an output of the photo diode in accordance with a predetermined algorithm, and measuring an optical wavelength, an optical power and an optical signal to noise ratio of a wavelength division multiplexed optical signal based on the analyzed reference wavelength.

A preferably used fiber bragg grating is a tilted fiber bragg grating that generates an amplified spontaneous emission signal having a reference wavelength of a main mode and a side mode, respectively, by either reflecting or absorbing the main mode reference wavelength and the side mode reference wavelength according to an inclination angle. Fortunately, when the tilted fiber bragg grating is employed, the reference wavelength of the amplified spontaneous emission is increased by more than twice, which further makes it possible to improve the resolution of the wavelength division multiplexed optical signal (WDMOS) on the basis of the reference wavelength.

An apparatus constructed in accordance with the principles of the present invention enables one to measure the optical wavelength, the optical power, and the optical signal to noise ratio of the wavelength division multiplexed optical signal (WDMOS), even in the optical link section without a fiber amplifier.

To achieve these and other objects in accordance with the principles of the present invention, as embodied and broadly described, the present invention provides an apparatus, comprising: an emitter for generating an amplified spontaneous emission signal and transmitting the amplified spontaneous emission signal to a reference optical path; at least one fiber bragg grating positioned on the reference optical path downstream of said emitter, said at least one grating transmitting an amplified spontaneous emission signal having at least one reference wavelength by performing at least one of reflecting and absorbing at least a part of the amplified spontaneous emission signal transmitted from said emitter; an optical switch for receiving a first optical signal corresponding to a wavelength division multiplexed optical signal branched from a main optical path and for receiving a second optical signal corresponding to the amplified spontaneous emission signal having at least one reference wavelength, said optical switch outputting at least one of the first and second signals, the outputting being performed in response to a switching control signal; a tunable optical filter for filtering the optical signals outputted from said optical switch, said filter having a plurality of variable filtering characteristics altered in accordance with a filtering control signal, said filter outputting the filtered optical signal; a photo diode for converting the filtered optical signal to an electrical signal and for outputting the converted signal; and a control unit for analyzing the converted signal in accordance with a predetermined algorithm, said control unit measuring an optical wavelength, an optical power, and an optical signal to noise ratio of the first optical signal, said control unit performing the measuring in accordance with the analyzing of said converted signal.

To achieve these and other objects in accordance with the principles of the present invention, as embodied and broadly described, the present invention provides an apparatus for monitoring wavelength division multiplexed optical signals, the apparatus comprising: an optical coupler positioned on a main optical path and receiving a wavelength division multiplexed optical signal, said coupler outputting a first part of the received multiplexed optical signal on the main optical path and outputting a second part of the multiplexed optical signal on a second optical path distinguishable from the main optical path; an emitter for generating an amplified spontaneous emission signal and for transmitting the amplified spontaneous emission signal to a reference optical path distinguishable from the main and second optical paths; at least one fiber bragg grating for receiving the amplified spontaneous emission signal from said emitter, said at least one grating performing at least one of reflecting and absorbing at least a part of the amplified spontaneous emission signal received from said emitter, said at least one grating transmitting a reference optical signal corresponding to an amplified spontaneous emission signal having at least one reference wavelength, said at least one grating including at least a first tilted fiber bragg grating having a first main mode wavelength and a first side mode wavelength; an optical switch for receiving at least one of the second part of the multiplexed optical signal received from said coupler and the reference optical signal transmitted from said at least one grating, said optical switch outputting at least one of the received optical signals, said optical switch performing the outputting in response to a received switching control signal; a tunable optical filter for filtering the optical signals outputted from said optical switch, said filter having a plurality of variable filtering characteristics altered in accordance with a received filtering control signal, said filter outputting the filtered optical signal; a photo diode for converting the filtered optical signal to an electrical signal and outputting the converted signal; and a control unit for analyzing the converted signal in accordance with a predetermined algorithm, said control unit measuring an optical wavelength, an optical power, and an optical signal to noise ratio of the first optical signal, said control unit performing the measuring in accordance with the analyzing of said converted signal.

To achieve these and other objects in accordance with the principles of the present invention, as embodied and broadly described, the present invention provides a method of measuring an optical signal, the method comprising the steps of: transmitting a wavelength division multiplexed optical signal on a main optical path; branching a part of the multiplexed optical signal away from the main optical path and onto a second optical path; generating an amplified spontaneous emission signal and transmitting the generated amplified spontaneous emission signal to a reference optical path; receiving the transmitted amplified spontaneous emission signal on the reference optical path and performing at least one of reflecting and absorbing at least a part of the transmitted amplified spontaneous emission signal; in response to said performing, transmitting a reference optical signal corresponding to an amplified spontaneous emission signal having at least one reference wavelength; receiving at least one of the branched multiplexed optical signal and the reference optical signal at a switch; receiving a switching control signal; outputting at least one of the received optical signals, said outputting being performed by the switch in response to the received switching control signal; receiving a filtering control signal; filtering the optical signals outputted from the switch, said filtering being performed by a filter having a plurality of variable filtering characteristics, the variable filtering characteristics being altered in accordance with the received filtering control signal; outputting the filtered optical signals; converting the filtered optical signal to an electrical signal and outputting the converted signal; analyzing the converted signal in accordance with a predetermined algorithm; and measuring an optical wavelength, an optical power, and an optical signal to noise ratio of the multiplexed optical signal, said measuring being conducted based on said analyzing of the converted signal.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention with unnecessary detail. It will be appreciated that, in the development of any actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
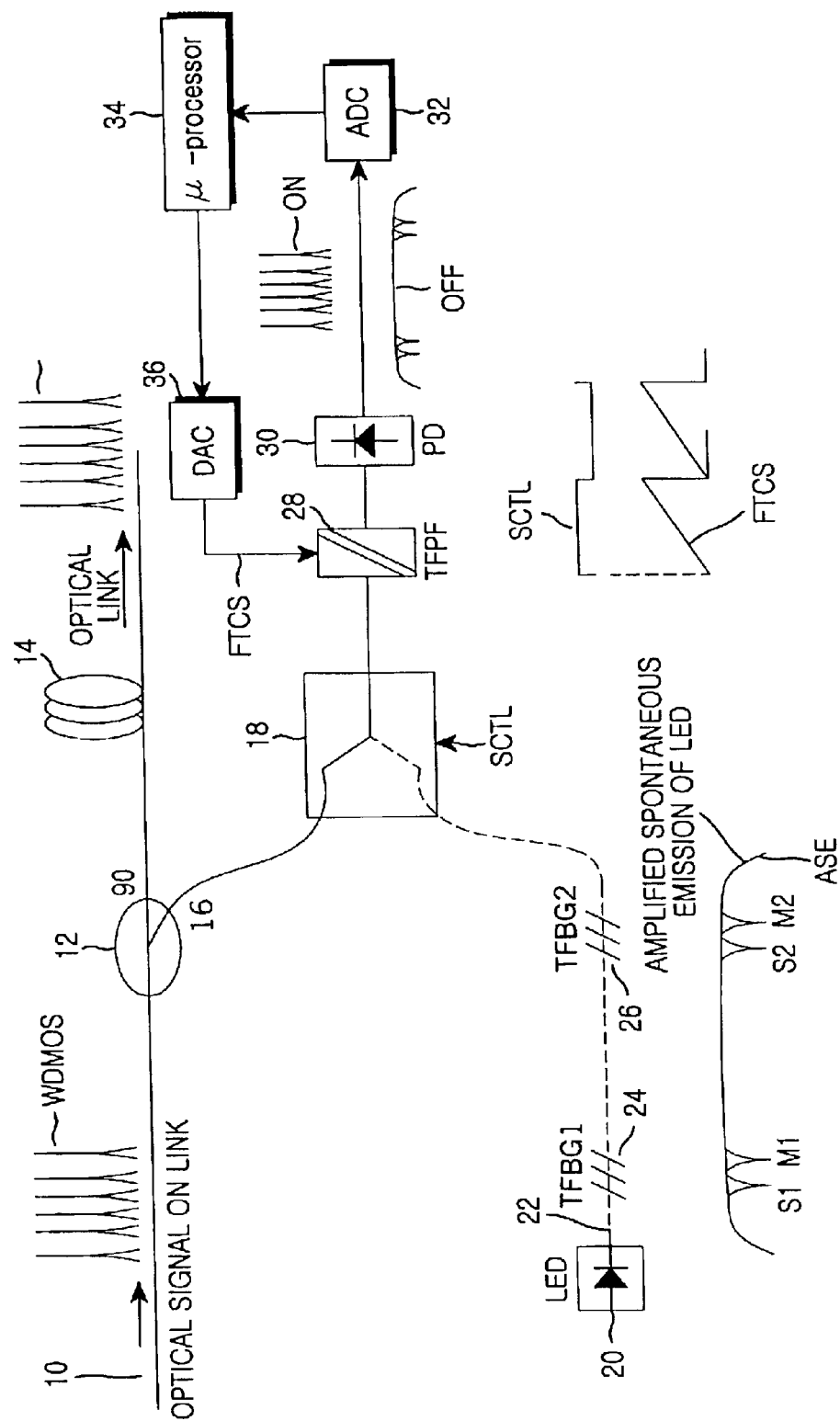
FIG. 1 diagrammatically shows a configuration of an apparatus for monitoring optical signal performance in a wavelength division multiplexing (WDM) system and an operation waveform of each component, in accordance with the principles of the present invention.
Figure 2:
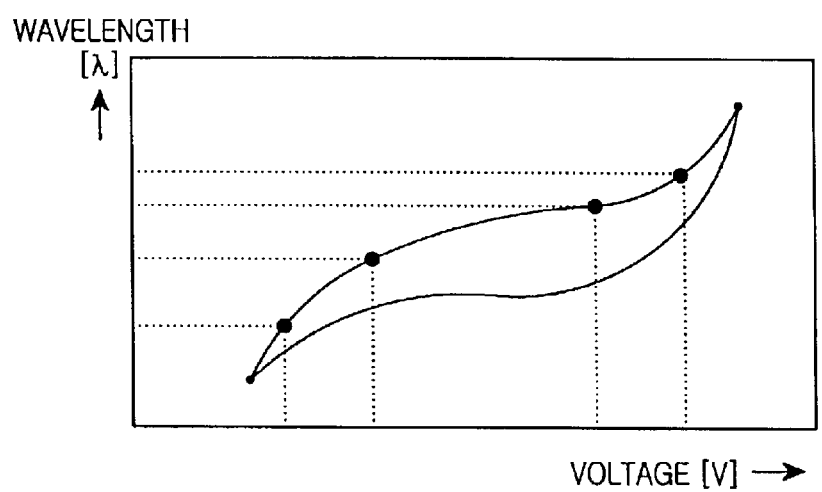
FIG. 2 diagrammatically shows hysterisis characteristics of a tunable optical filter widely used in optical performance monitors and reference wavelength values according to the principles of the present invention reflected on a hysterisis loop.

FIG. 1 diagrammatically shows a configuration of an apparatus for monitoring optical signal performance in a wavelength division multiplexing (WDM) system and an operation waveform of each component, in accordance with the principles of the present invention. FIG. 2 diagrammatically shows hysterisis characteristics of a tunable optical filter widely used in optical performance monitors and reference wavelength values according to the principles of the present invention reflected on a hysterisis loop. The dotted parts in FIG. 2 represent the reference wavelength values.

Referring to FIG. 1, if the optical signal on an optical link, more specifically, if the wavelength division multiplexed optical signal (WDMOS) is transmitted onto an optical path 10, approximately 10% of the WDMOS transmitted onto the optical path branches off onto an optical path 16 through an optical coupler 12 having the 9:1 branching ratio. In the meantime, the remaining 90% of the WDMOS is transmitted onto another optical link through a fiber spool.

A light emitting diode (LED) 20 sends out an amplified spontaneous emission (ASE) signal to a reference optical fiber 22. On the reference optical fiber 22, two tilted fiber bragg grating (TFBG) 24 and 26 are disposed being apart from each other by a designated distance. These tilted fiber bragg gratings 24 and 26 are downstream of the light emitting diode 20, and thus the amplified spontaneous emission output from the light emitting diode 20 is conveyed toward the gratings 24 and 26. These tilted fiber bragg gratings 24 and 26 set the reference wavelengths of the amplified spontaneous emission, and include a reflection wavelength or an absorbance wavelength of about 3 decibels (dB) main modes Mi (here, i is an integer 1 or 2) and side modes Si (here, i is an integer 1 or 2). For example, as depicted in the diagram, the tilted fiber bragg grating 24 generates the reference wavelength of the main mode M1 and the side mode, respectively, for the amplified spontaneous emission transmitted onto the optical fiber 22. Similarly, the tilted fiber bragg grating 26 generates the reference wavelength of the main mode M2 and the side mode S2 for the amplified spontaneous emission transmitted onto the optical fiber 22. Thus, the tilted fiber bragg gratings 24 and 26 are placed in such a manner that the wavelengths of the Mi and the side mode Si are outputted from the particular positions shown in FIG. 1.

As described above, the present invention is very useful for wavelength analysis in that it enables the generation of an amplified spontaneous emission signal using the light emitting diode 20, and the setting of approximately two times more reference wavelengths by using two tilted fiber bragg gratings 24 and 26, instead of a typical fiber bragg grating, in which each tilted fiber bragg grating has the wavelengths for the main mode Mi and the side mode Si. Such result is obtained because the present invention takes advantage of factors of the reference wavelength used in the analysis of the optical signal wavelength in various ways. The amplified spontaneous emission signal generated with the reference wavelengths for the main mode Mi and the side mode Si is then inputted through the optical fiber 22 to another side of a 2×1 optical switch 18 connected to the emission.

The optical switch 18 is switched according to a pulse type switching control signal (SCTL) input logic as shown in FIG. 1, and selectively outputs either the wavelength division multiplexed optical signal (WDMOS) inputted to an optical fiber 16 or the amplified spontaneous emission having the added reference wavelengths of the main modes Mi and the side modes Si. For instance, if the switching control signal (SCTL) is inputted as a logic "High", the optical switch 18 selects the wavelength division multiplexed optical signal WDMOS, while if the switching control signal (SCTL) is inputted as a logic "Low", the optical switch 18 selects the amplified spontaneous emission ASE with the added reference wavelength. Once the selection is made by the optical switch 18, the wavelength division multiplexed optical signal (WDMOS) or the amplified spontaneous emission (ASE) with the added wavelength is provided to an optically coupled tunable optical filter 28 through the optical fiber.

The tunable optical filter 28 changes the transmission wavelength depending on the voltage level of a filtering control signal (FTCS) inputted to a control terminal. At this time, the filtering control signal (FTCS) provided to the control terminal of the tunable optical filter 28 looks like a sawtooth wave as depicted in FIG. 1, and its cycle is the same with the switching control signal (SCTL). Accordingly, in accordance with the optical filter coefficient depending on the voltage level of the filtering control signal (FTCS), the tunable optical filter 28 filters the wavelength division multiplexed optical signal (WDMOS) outputted from the optical switch 18 or the amplified spontaneous emission (ASE) with the added reference wavelengths of the main modes Mi and the side modes Si.

A preferable example of the tunable optical filter 28 is a tunable Fabry-Perot filter (TFPF). Especially, the tunable Fabry-Perot filter 28 is known to have voltages and wavelengths of the filtering control signals authorized as the control terminal in a non-linear proportional relationship. More specifically, the voltages and the input waves of the filtering control signals of the tunable Fabry-Perot filter 28 are changed to a hysterisis form, which is nonlinear.

The photoelectric transducer shown in FIG. 1, that is, the photo diode 30, selected by the operation of the optical switch 18 and the tunable optical filter 28, converts the wavelength division multiplexed optical signal (optical channel) that underwent the tunable optical filtering process, or the amplified spontaneous emission (ASE) with the added reference wavelength, to an electric signal, and provides the electric signal to an analog to digital converter (ADC) 32. The analog to digital converter 32, as depicted in FIG. 1, performs a selective digital conversion on an outputted signal of the optical channel signal or a spectrum of the amplified spontaneous emission with the added reference wavelength, and then provides the digital converted signal or spectrum to a microprocessor 34.

The microprocessor 34, in accordance with a masked program in an internal memory, transmits control data corresponding to the switching control signal (SCTL) and the filtering control signal (FTCS) shown in FIG. 1 to a digital to analog converter (DAC) 36, and controls the optical switch 18 and the tunable optical filter 28 using the analog signal as in FIG. 1. Also, the microprocessor 34 inputs a value of the wavelength division multiplexed optical signal (WDMOS) outputted from the analog to digital converter 32 and a value of the amplified spontaneous emission (ASE) with the added reference wavelengths of the main mode Mi and the side mode Si. Further, the microprocessor 34 finds-out determines the reference wavelength values of the main modes M1 and M2, and the side modes Si and S2, from the inputted amplified spontaneous emission (ASE) value. Here, the main modes M1 and M2, and the side modes S1 and 52, are reference signals of the amplified spontaneous emission, and the reference signal is used to calculate the optical signal (WDMOS) wavelength, the optical power, and the optical signal to noise ratio.

The reference wavelength values of the main modes M1 and M2, and the side modes S1 and S2, obtained from the amplified spontaneous emission (ASE) value, consist the reflection wavelength values or the absorbance wavelength values of the tilted fiber bragg gratings 24 and 26, which are already known through measurement. In this manner, that is, using the reference wavelength values of the main modes Mi, and the side modes Si on the time base, the microprocessor 34 inputting the reference wavelength values can monitor the wavelength value, the optical signal power, and the optical signal to noise ratio of the successively inputted wavelength division multiplexed optical signal (WDMOS) more easily.

Among other components of the apparatus, the photo diode 30, the analog to digital converter 32, the microprocessor 34 and the digital to analog converter (DAC) 36 are components of a control unit mounted on a print board, and if necessary, they can be constructed as one chip.

The present invention brings about improved resolution of the optical signal by generating amplified spontaneous emission using a light emitting diode, and by generating many more reference wavelengths (at least twice more reference wavelengths) to the amplified spontaneous emission using tilted fiber bragg gratings rather than a typical fiber bragg grating. In addition, the present invention is capable of monitoring the optical signals on the optical link very easily without any fiber amplifier.

The present invention is very useful for monitoring the optical signals in the optical link section without a fiber amplifier because it can generate the reference wavelengths of the amplified spontaneous emission to analyze the wavelength division multiplexed optical signal. Further, by using the reference wavelength of the amplified spontaneous emission (or the discrimination signal of the amplified spontaneous emission) and the tunable optical filter, the present invention enables an optical signal measuring system to take a precise measurement of the wavelength, the optical power, and the signal to noise ratio of the optical signal by generating more reference wavelength within a hysterisis characteristic section of the tunable optical filter using at least one tilted fiber bragg grating for generating two or more reference wavelengths.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   an emitter for generating an amplified spontaneous emission signal and transmitting the amplified spontaneous emission signal to a reference optical path;
   at least one fiber bragg grating positioned on the reference optical path downstream of said emitter, said at least one fiber bragg grating transmitting an amplified spontaneous emission signal having at least one reference wavelength by performing at least one of reflecting and absorbing at least a part of the amplified spontaneous emission transmitted from said emitter;
   an optical switch for receiving a first optical signal corresponding to a wavelength division multiplexed optical signal branched from a main optical path and for receiving a second optical signal corresponding to the amplified spontaneous emission signal having at least one reference wavelength, said optical switch outputting at least one of the first and second signals, the outputting being performed in response to a switching control signal;
   a tunable optical filter for filtering the optical signals outputted from said optical switch, said filter having a plurality of variable filtering characteristics altered in accordance with a filtering control signal, said filter outputting a filtered optical signal;
   a photo diode for converting the filtered optical signal to an electrical signal and for outputting the converted signal; and
   a control unit for analyzing the converted signal in accordance with a predetermined algorithm, said control unit measuring an optical wavelength, an optical power, and an optical signal to noise ratio of the first optical signal, said control unit performing the measuring in accordance with the analyzing of said converted signal;
   said at least one grating being a tilted fiber bragg grating having a main mode wavelength and a side mode wavelength.

2. The apparatus of claim 1, said control unit performing the measuring in accordance with both the analyzing of said photo diode and the analyzing of the converted signal.

3. The apparatus of claim 1, further comprising an optical coupler disposed on the main optical path, said optical coupler outputting part of the wavelength division multiplexed optical signal to said optical switch.

4. The apparatus of claim 1, said emitter comprising a light emitting diode.

5. The apparatus of claim 4, said tunable optical filter comprising a tunable Fabry-Perot filter, the plurality of variable filtering characteristics including a changing of a transmission wavelength band.

6. The apparatus of claim 1, said tunable optical filter comprising a tunable Fabry-Perot filter, the plurality of variable filtering characteristics including a changing of a transmission wavelength band.

7. An apparatus for monitoring wavelength division multiplexed optical signals, said apparatus comprising:
   an optical coupler positioned on a main optical path for receiving a wavelength division multiplexed optical signal, said coupler outputting a first part of the received multiplexed optical signal on the main optical path and outputting a second part of the multiplexed optical signal on a second optical path distinguishable from the main optical path;
   an emitter for generating an amplified spontaneous emission signal and for transmitting the amplified spontaneous emission signal to a reference optical path distinguishable from the main and second optical paths;
   at least one fiber bragg grating for receiving the amplified spontaneous emission signal from said emitter, said at least one grating performing at least one of reflecting and absorbing at least a part of the amplified spontaneous emission signal received from said emitter, said at least one grating transmitting a reference optical signal corresponding to an amplified spontaneous emission signal, having at least one reference wavelength, said at least one grating including at least a first tilted fiber bragg grating having a first main mode wavelength and a first side mode wavelength;

an optical switch for receiving at least one of the second part of the multiplexed optical signal received from said coupler and the reference optical signal transmitted from said at least one fiber bragg grating, said optical switch outputting at least one of the received optical signals, said optical switch performing the outputting in response to a received switching control signal;

a tunable optical filter for filtering the optical signals outputted from said optical switch, said filter having a plurality of variable filtering characteristics altered in accordance with a received filtering control signal, said filter outputting a filtered optical signal;

a photo diode for converting the filtered optical signal to an electrical signal and for outputting the converted signal; and a control unit for analyzing the converted signal in accordance with a predetermined algorithm, said control unit measuring an optical wavelength, an optical power, and an optical signal to noise ratio of the first optical signal, said control unit performing the measuring in accordance with the analyzing of said converted signal.

8. The apparatus of claim 7, said emitter comprising a light emitting diode.

9. The apparatus of claim 8, said tunable optical filter comprising a tunable Fabry-Perot filter.

10. The apparatus of claim 7, the plurality of variable filtering characteristics including a changing of a transmission wavelength band.

11. The apparatus of claim 7, said tunable optical filter comprising a tunable Fabry-Perot filter, the plurality of filtering characteristics including a changing of a transmission wavelength band.

12. The apparatus of claim 7, said at least one fiber bragg grating further including at least a second tilted fiber bragg grating having a second main mode wavelength and a second side mode wavelength, said first and second main mode wavelengths being distinguishable, said first and second side mode wavelengths being distinguishable.

13. A method of measuring an optical signal, the method comprising the steps of:

transmitting a wavelength division multiplexed optical signal on a main optical path;

branching a part of the multiplexed optical signal away from the main optical path and onto a second optical path;

generating an amplified spontaneous emission signal and transmitting the generated amplified spontaneous emission signal to a reference optical path;

receiving the transmitted amplified spontaneous emission signal on the reference optical path;

providing at least one fiber bragg grating having a main mode wavelength and a side mode wavelength for performing at least one of reflecting and absorbing at least a part of the transmitted amplified spontaneous emission signal;

transmitting a reference optical signal corresponding to an amplified spontaneous emission signal having at least one reference wavelength;

receiving at least one of the branched multiplexed optical signal and the reference optical signal at a switch; outputting at least one of the received optical signals, said outputting being performed by the switch in response to a switching control signal;

filtering the optical signals outputted from the switch, said filtering being performed by a filter having a plurality of variable filtering characteristics, and outputting a filtered optical signal, the variable filtering characteristics being altered in accordance with a filtering control signal;

converting the filtered optical signal to an electrical signal and outputting the converted signal;

analyzing the converted signal in accordance with a predetermined algorithm; and measuring an optical wavelength, an optical power, and an optical signal to noise ratio of the multiplexed optical signal, said measuring being conducted based on said analyzing of the converted signal.

14. The method of claim 13 said filtering being conducted by a tunable Fabry-Perot filter, said generating being conducted by a light emitting diode.

15. The method of claim 13, the plurality of variable 2 filtering characteristics including a changing of a transmission wavelength band.

* * * * *